US008845261B2

(12) United States Patent
Kroecker

(10) Patent No.: US 8,845,261 B2
(45) Date of Patent: Sep. 30, 2014

(54) MULTIPLE SHIPPING CONTAINER OMNI-DIRECTIONAL CRADLE

(75) Inventor: Stephan Vincent Kroecker, Titusville, FL (US)

(73) Assignee: Stephan V. Kroecker, Titusville, FL (US)

( * ) Notice: Subject to any disclaimer, the term of this patent is extended or adjusted under 35 U.S.C. 154(b) by 195 days.

(21) Appl. No.: 13/596,312

(22) Filed: Aug. 28, 2012

(65) Prior Publication Data

US 2014/0060948 A1 Mar. 6, 2014

(51) Int. Cl.
*B63B 25/28* (2006.01)
*B60P 3/00* (2006.01)

(52) U.S. Cl.
CPC .. *B63B 25/28* (2013.01); *B60P 3/00* (2013.01)
USPC ........................................ 414/139.9; 414/347

(58) Field of Classification Search
USPC ....................... 105/375; 108/56.1; 410/66, 67; 414/137.1, 139.4, 139.6, 139.7, 139.9, 414/140.1, 140.3, 141.3, 143.2, 331.03, 414/340, 341, 345, 347, 522
See application file for complete search history.

(56) References Cited

U.S. PATENT DOCUMENTS 2,430,267 A * 11/1947 Arthur ......................... 108/56.1
3,240,363 A * 3/1966 Knight, Jr. ................. 414/140.1
3,690,485 A * 9/1972 Fischer et al. ........... 414/416.12
5,599,153 A * 2/1997 Svensson .................... 414/143.2
5,618,148 A * 4/1997 Iversen et al. .............. 414/139.9
6,010,021 A * 1/2000 Zuidam et al. ................. 220/1.5
6,902,368 B2 * 6/2005 Hagenzieker et al. ..... 414/139.9
7,507,061 B2 * 3/2009 Wells et al. ...................... 410/46
7,845,898 B2 * 12/2010 Rawdon et al. ............... 414/809
8,360,708 B2 * 1/2013 Mashburn .................. 414/746.8

FOREIGN PATENT DOCUMENTS

WO    WO 0236423 A1 *  5/2002

* cited by examiner

*Primary Examiner* — Gregory Adams

(57) ABSTRACT

A system of single or multiple modules with self driving capabilities specifically for the movement of single or multiple shipping containers with a single operator on foot using a 'wireless control unit' to imitate commands to the individual modules, inter-connected to act in concert. As the units are configured from one (1) to forty-five (45) containers, the modules are connected utilizing the specialty pin assembly inherent to the invention.

The invention has the capability to articulate in the vertical plane, allowing the complete modular unit to transverse inclines; declines and slight obstructions while in the normal operational environment. This accommodates ramps up or down onto the barges, or onto surfaces in the receiving ports.

The 'wireless control unit' also allows the operator and the Command and Control operations to visualize the individual module while transversing all surfaces allowing for the visualization of the stack in a three dimensional display.

11 Claims, 9 Drawing Sheets

Four Container Modules in series

Top Plan View

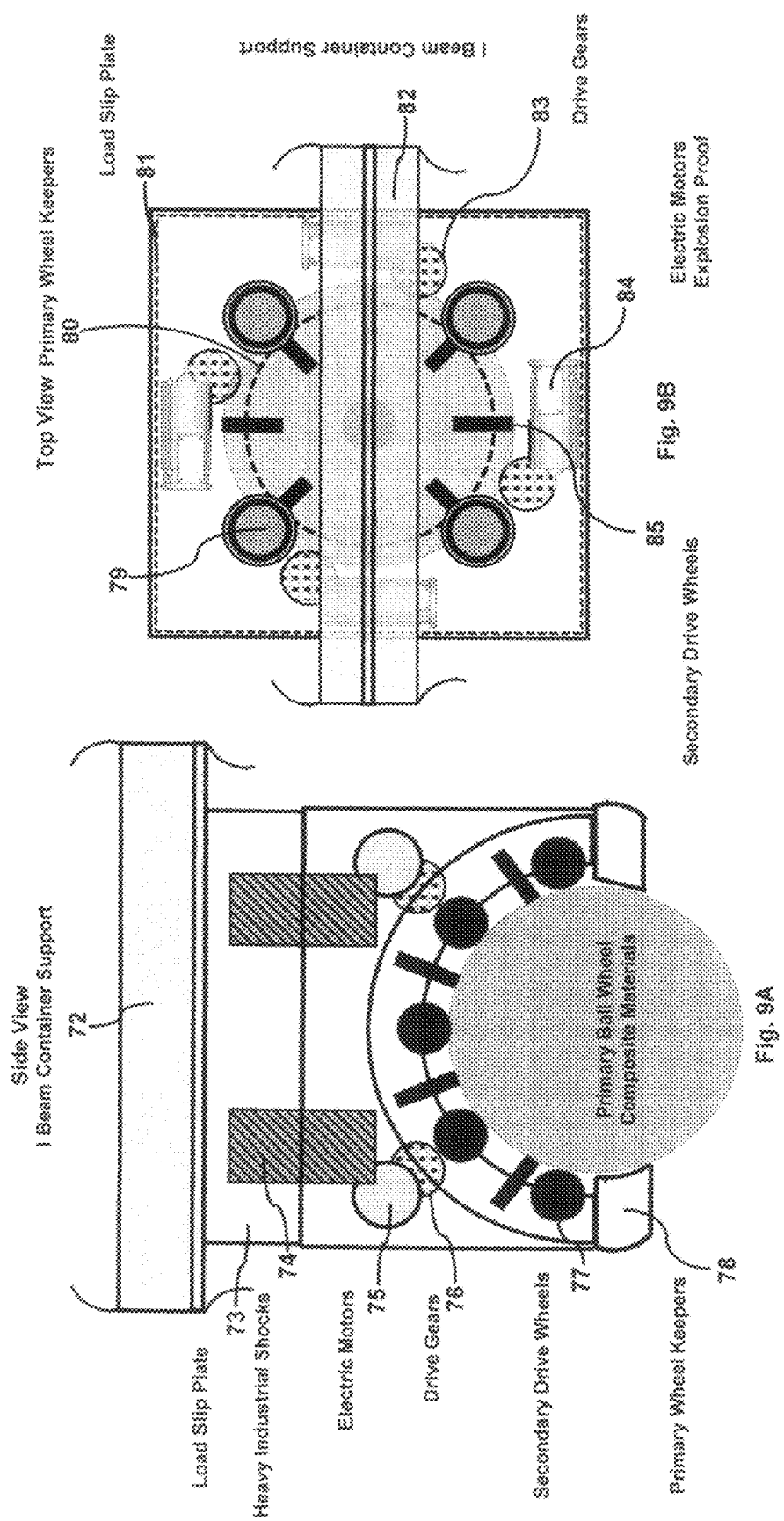

MULTIPLE SHIPPING CONTAINER OMNI-DIRECTIONAL CRADLE

BACKGROUND OF THE INVENTION

The present invention relates to the movement of shipping containers in a fashion not yet conceived, prior to this invention. From a single container and a single operator with a synchronized radio-transmitter to a stack of sixteen or more forty foot shipping containers, this invention can move about and accurately place all shipping containers safely by the single operator.

It is recognized that there are ancillary purposes for this invention including, but not limited to, further non-intrusive inspection; isolation; complete inspections; rapid loading and unloading of the delivery vessels; port container movement efficiencies; destination bundling; and, increased utilization of intermodal and smaller cargo ports.

The present invention contemplates a basic unit composed of the main container frame and either the standard four ball wheels, or in the case of a single container cradle mover, six ball wheels. These ball wheels provide for the omni-directional capabilities of the system, as well as the requirement of a single operator.

The invention would provide the capabilities of multiple stacking which is meant to be up to five standard forty foot shipping containers wide and five standard forty foot shipping containers high. A heavy duty 'Gantry Crane' would be utilized to lower or lift the component 'twenty-five stack'. The invention further expects heavy duty units with more container capacity becoming a standard and is a component of the invention.

BRIEF SUMMARY OF THE INVENTION

A system of shipping container sized cradle units, of up to five across and able to support the weight of containers stacked five high; having the ability to transverse omni-directionally a yard of area whereby it is normal to move containers for delivery to an end destination; or to be delivered to a vessel for transportation to another destination.

Ancillary to the aspects of the invention is the inventions additional capabilities. The cradles are expandable by adding more to the standard five wide; will be moved by a single operator utilizing a synchronized radio-transmitter; when the locking collars are extended and in-place the unit is no longer flexible and can be lifted or lowered depending upon the destination. Once delivery is accomplished, the locking collars are disengaged and the component unit reacquires the required flexibility to transverse the shipping yards, docks and platforms.

BRIEF DESCRIPTIONS OF THE DRAWINGS

FIG. 9A illustrates a side view of the omni-directional ball wheel assembly, as shown in FIG. 1; and FIG. 9B illustrates a top view of the omni-directional ball wheel assembly as shown in FIG. 1.

DETAIL DESCRIPTION OF THE INVENTION

Figure 1:
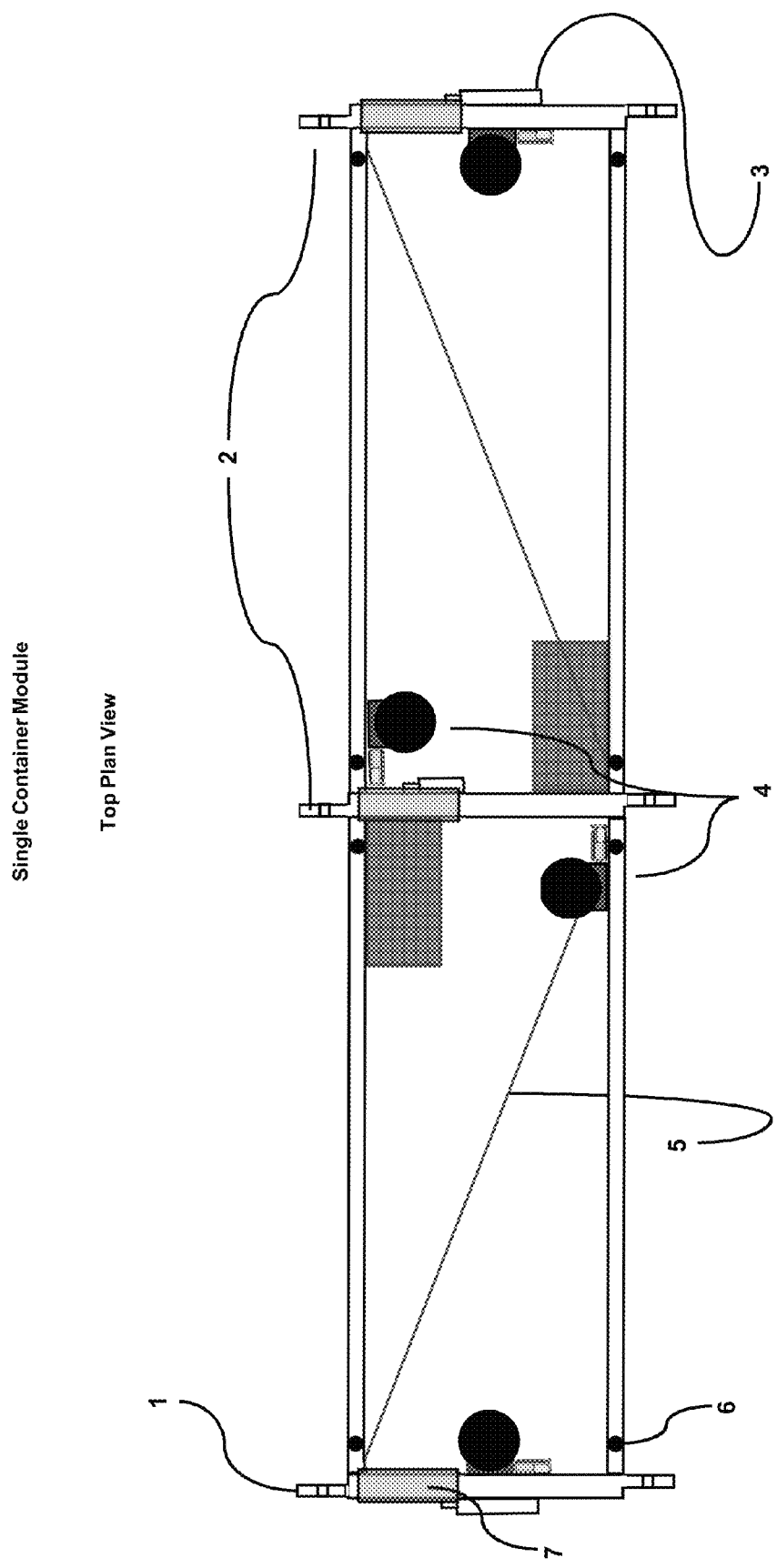
FIG. 1 Illustrates one exemplary form of the invention's structure having a top plan view, depicting the standard container cradle utilized with at least one additional standard cradle in accordance with the present invention; placement of the Omni-directional wheels and balancing battery system on a single container module.

Turning now to FIG. 1, utilizing the top view of the invention, 1, is indicating the module as a whole; 2, illustrates the pin assemblies appositionally end to end, in the center as well as on one end; 3, depicts the top view of the hydraulic piston which pushes the pin locking rail over the pin assemblies creating a rigid set of modules for lifting and lowering; 4, shows the Omni-directional ball wheel assemblies from the top view and the relationship of their mounting to the frame module providing balance to the system; 5, illustrated the reinforcing rod assembly utilized to square, straighten and reinforce modules when connected; 6, shows the receiver blocks for the containers as per 'standard container specifications'; and 7, depicts the outside top view of the pin locking rail.

Figure 2:
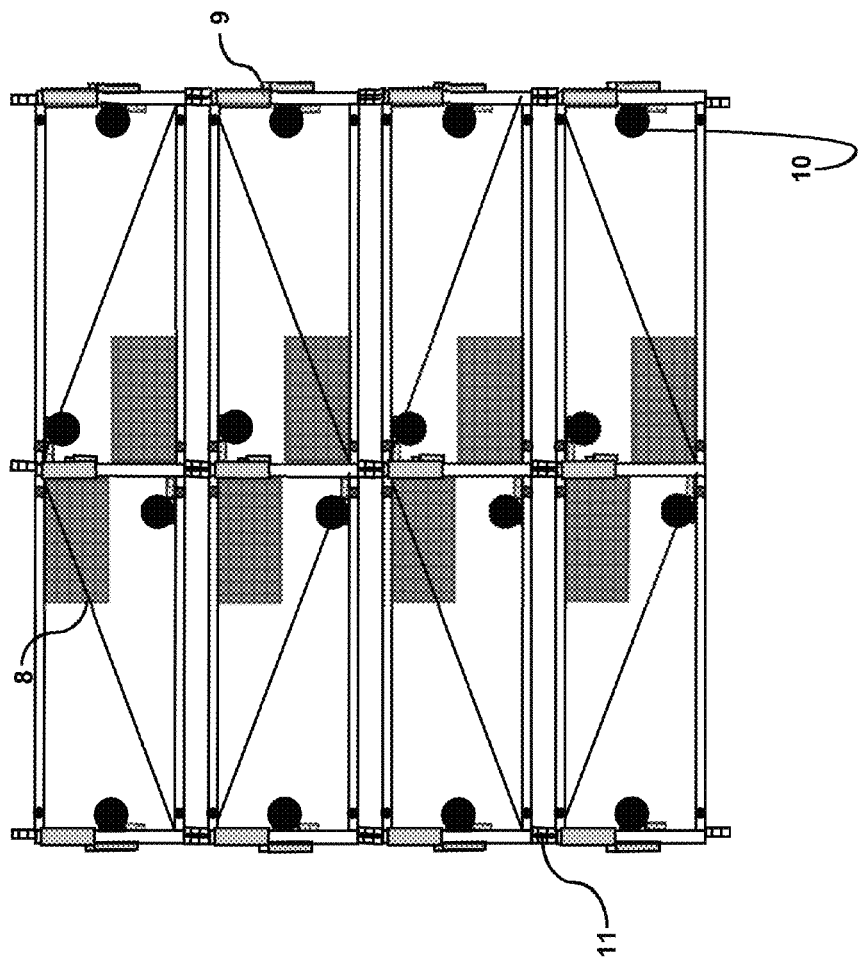
FIG. 2 illustrates one possible configuration from a top plan view, showing the four cradle module component configuration; with the cradle locking collars in the open position, used in FIG. 1.

Referring now to FIG. 2, illustrated the top view of a four module container moving unit. 8, depicts the battery storage power cell that is positioned opposite one another further proving balance to the modules; 9, depicts the pin locking rail in the open or unlocked lifting or lowering position, which gives the modules the required flexibilities to transverse uneven terrains; 10, shows the Omni-directional ball wheel assembly, centered at either end of the module providing a two foot diameter under the eight foot wide ends of the containers, thus preventing corner roll of the present invention; and, 11, illustrates the pin assembly with pins inserted but not locked.

Figure 3:
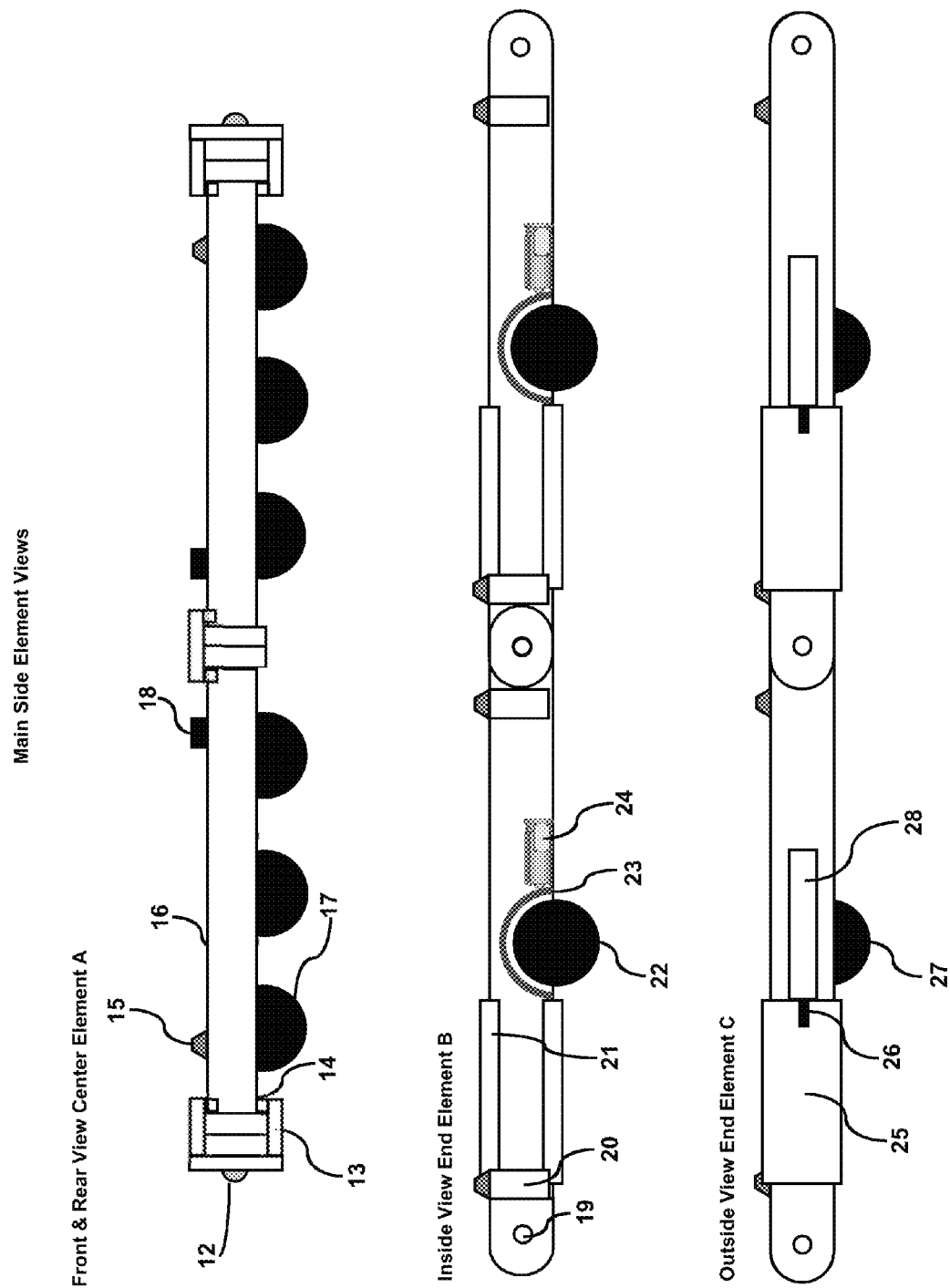
FIG. 3 is the embodiment of a dual cradle side and end views including ball wheel placement; inner and outer component views; the cradle locking collars in the open or flexible positions used in FIG. 1.

Turning now to FIG. 3, FIG. 3A, front and rear views 12, depicts a partial view of the hydraulic pin ram assembly; 13, shows the end view of the pin locking rail; 14, shows the end view of the guide rails for the pin locking rail; 15, depicts the end view of the container receiver block; 16, shows the top section of the reinforced end rails of the modules 17, depicts the Omni-directional ball wheel from either the front or end views; 18, shows the mid-receiving blocks to prevent downward bending towards the present invention; FIG. 3B, 19, shows the inside end view and illustrated the whole for the pin assembly; 20, shows the mounting block for the container receiver; 21, shows the lip over portion of the pin locking rail; 22, illustrates the inside end view of the ball wheel; 23, shows the upper shield of the ball wheel assembly; 24, illustrates the explosion proof electric motor; FIG. 3C, 25, illustrates the outside end view of the pin locking rail; 26, shows the hydraulic ram shaft connecting to the pin locking rail; 27, illustrates the outside end view of the wheel ball; and, 28, shows the outside end view of the hydraulic piston.

Figure 4:
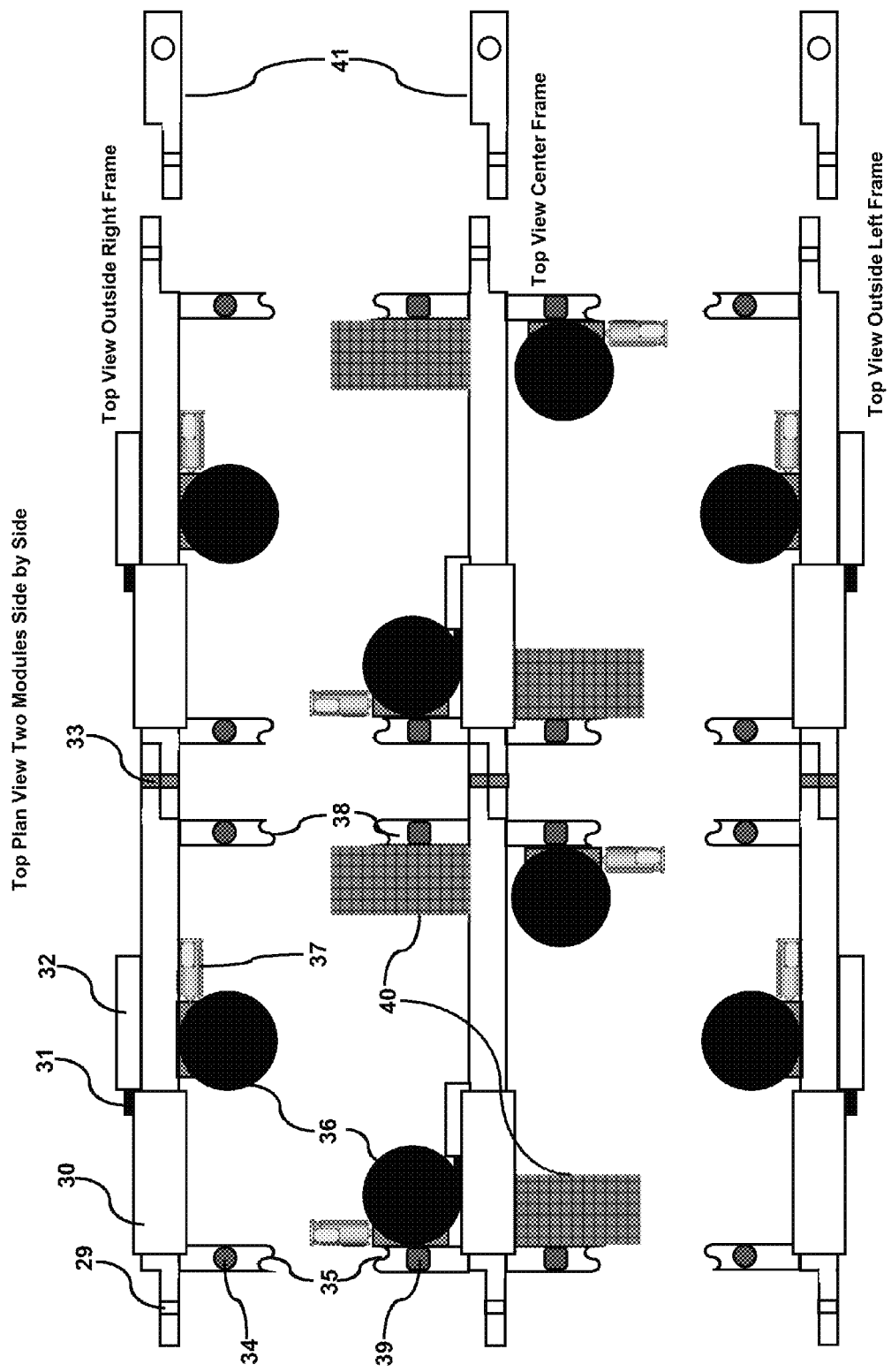
FIG. 4 illustrates the top views of the inventions depicting the right; center and left side of two nodules pinned together and the relationship of the ball wheels placement; batteries placements; and, locking collars from the top as in FIG. 1.

Turning now to FIG. 4, 4A, 29, illustrate the top plan view of the right side of the module frame showing opposite pin locking arms of the main outside right frame; 30, depicts the top view of the pin locking rail in its retracted state; 31, shows top view of the hydraulic ram arm attached to the pin locking rail; 32, depicts the top view of the hydraulic piston mounted to the outside reinforce member of the module frame; 33, illustrates the pins inside the pin alignment holes; 34, illustrated the container mounting block on the modules cross member; 35, illustrates the top view of the cross member; 36, shows the top view of the relationship of the ball wheel assembly top a single module as well as multiple modules; 37, illustrates again the top view of the explosion proof electric motor; 38, illustrates the second cross member of the module; 39, shows the placement from the top view of the mid section container receiver blocks; 40, illustrates the top view and relative positions of the two batteries utilized within each singular module, as wells as multiple modules; and, 41, illustrates the top view of the container crane lifting lugs utilized by the ancillary container module crane.

Figure 5:
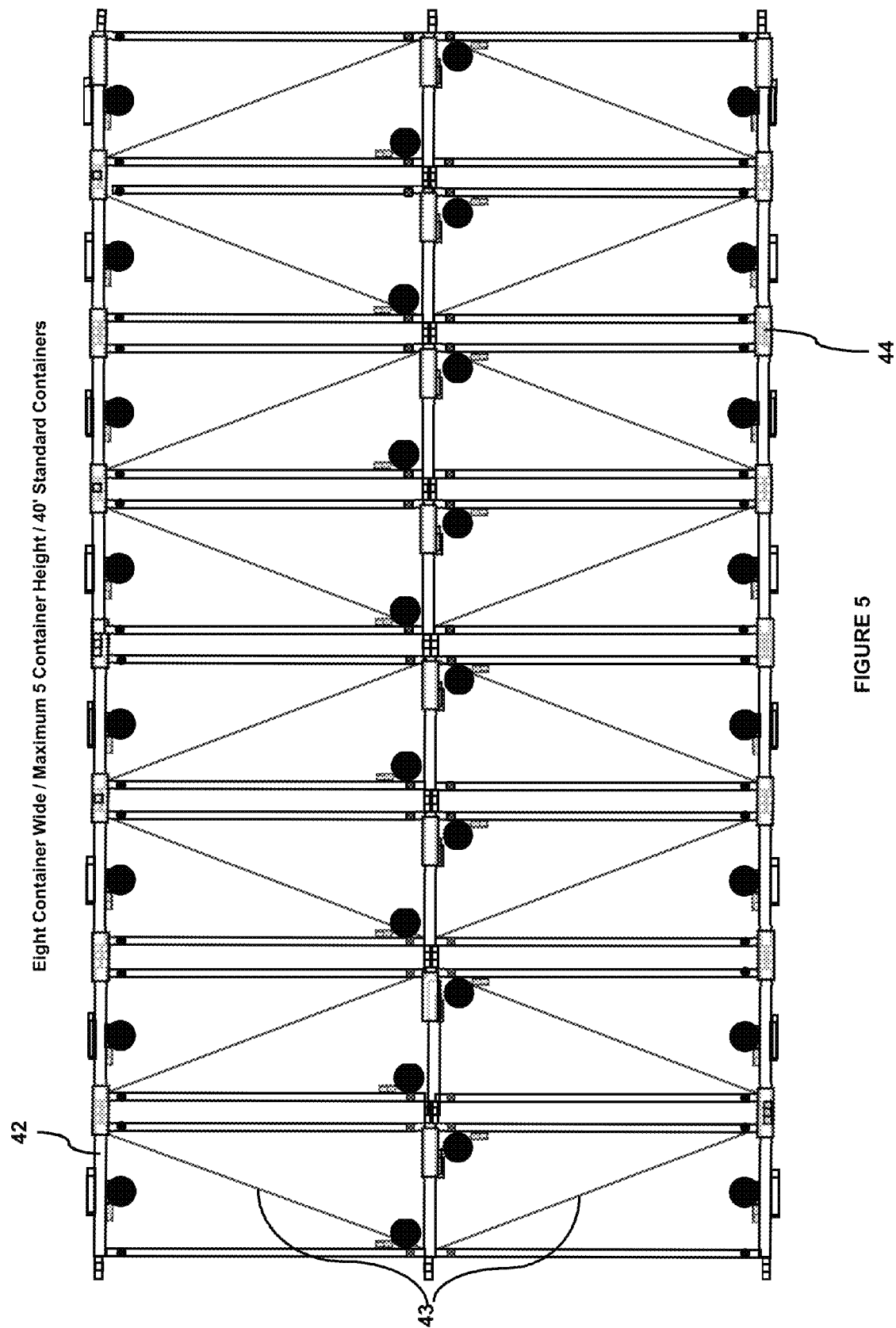
FIG. 5 illustrates again the top view of eight modules pinned together for maximum use of the system used in FIG. 1.

Turning now to FIG. 5, 42, illustrates the top view of a standard eight module wide unit, which has the total height capability of five containers; 43, illustrates the top view of the reinforcing rod assembly which is configured to work in opposition to one another during container movement; and, 44, illustrates the top view of the pin locking rails in the closed or locked positions.

Figure 6:
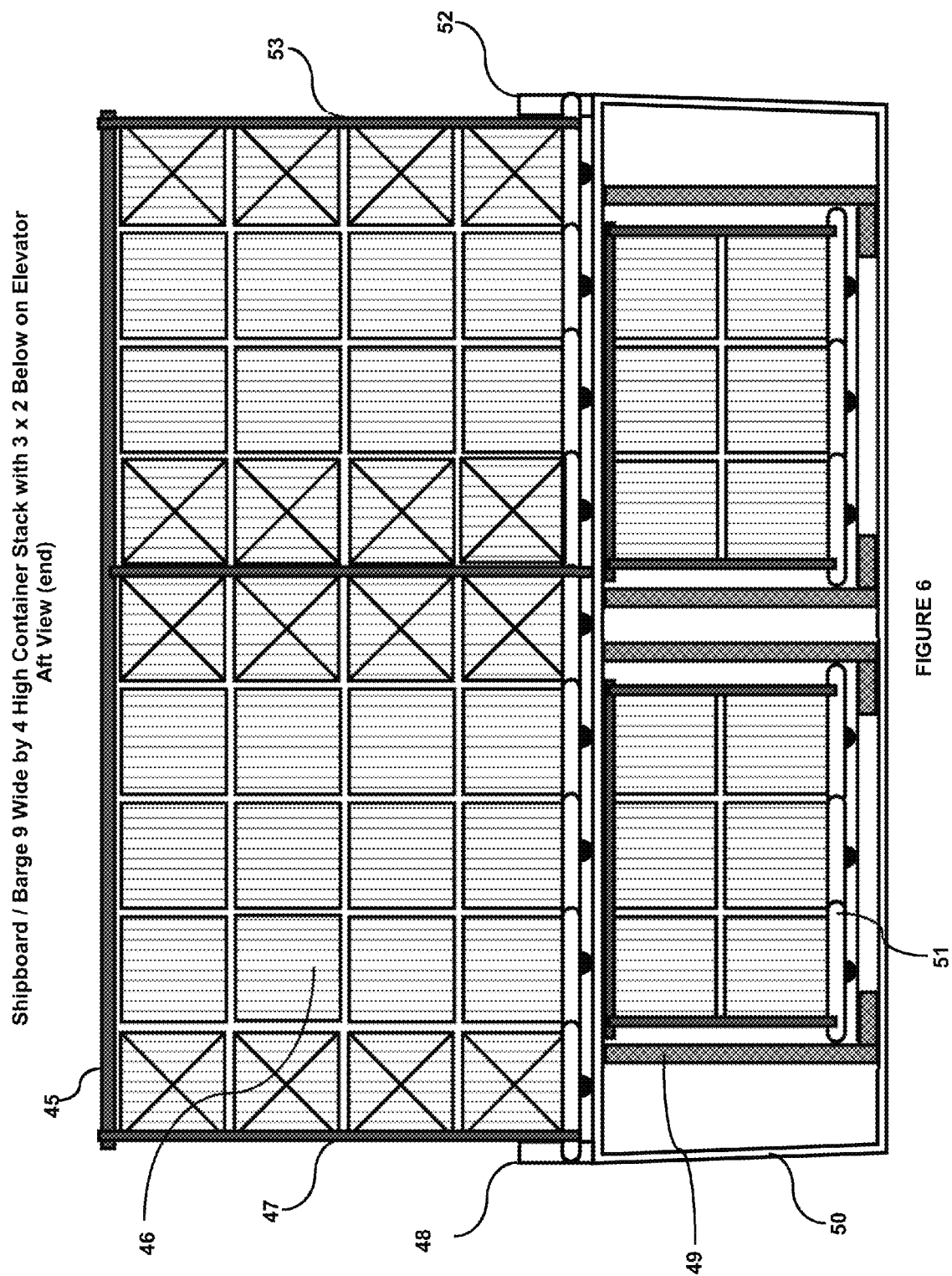
FIG. 6 illustrates one standard configuration utilizing the end view of a high-speed ocean going container barge with the lower holds containing three modules wide and two containers high, on elevators with the hatches closed and loaded onto the hatches are a five wide by four high module and a four wide by four high module of the invention in FIG. 1.

Referring now to FIG. 6, 45, depicts the aft or end view of a supplemental horizontal reinforcing angle to be utilized in the event of existing or expected inclement weather, assisting in the additional security of the containers on-board the high speed ocean going container barges; 46, illustrates the standard and recommended four high container stacking arrangement; 47, illustrated the vertical supplemental reinforcing 'foul' weather member; 48, shows the end view of the port side retractable container mover blocks, locking the container mover to the barge; 49, depicts the end view of below deck container elevators; 50, illustrates the outside hull form on the end view of the high speed ocean going barge; 51, shows the placement below deck of a smaller three wide by two high container mover configuration; 52, depicts the end view or starboard side container movers locking blocks; and, 53, illustrates the vertical supplemental reinforcing 'foul' weather member.

Figure 7:
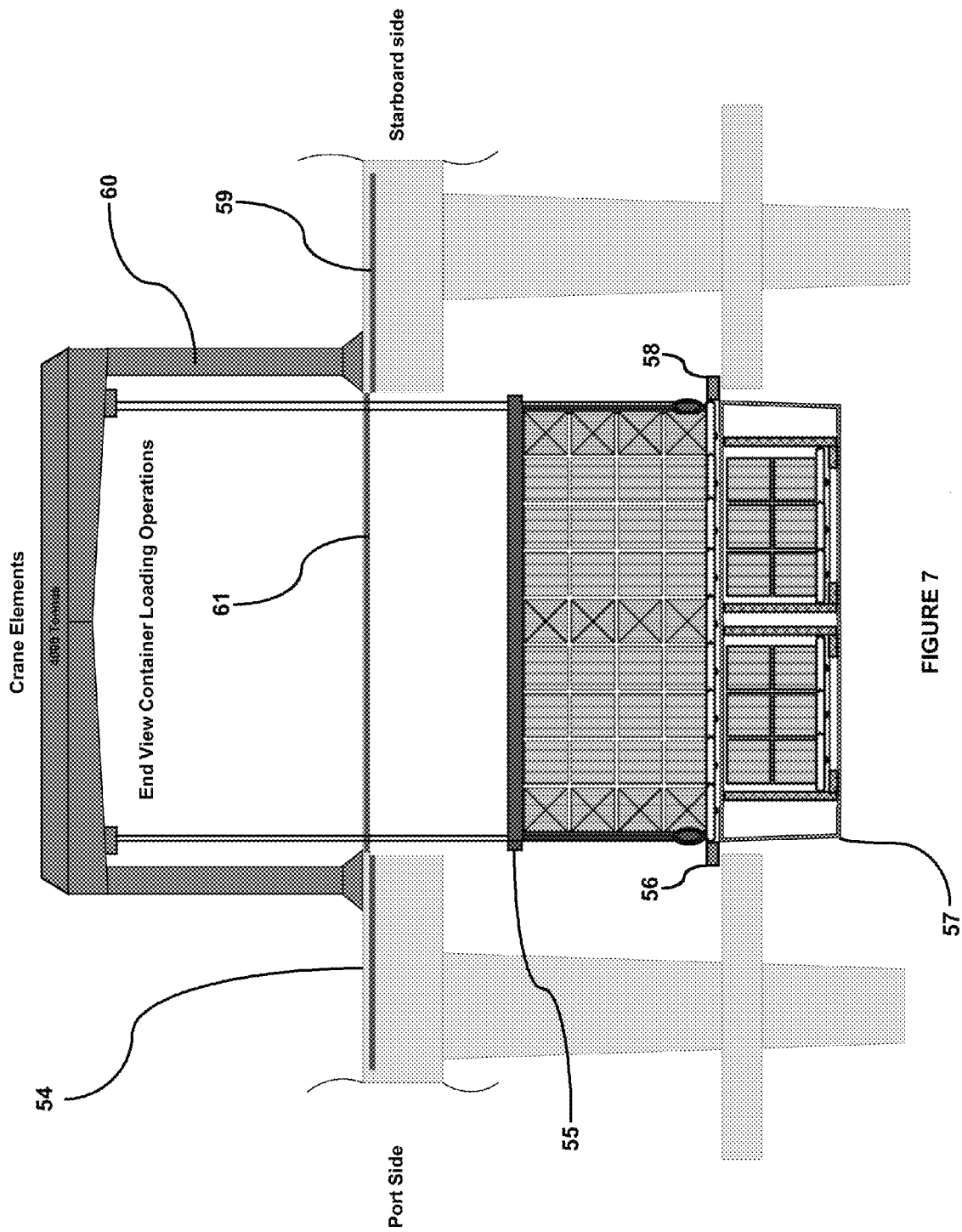
FIG. 7 illustrates the optional Gantry Crane components contemplated as a standard element of the overall system, which has a Four Thousand ton capacity; is rail mobile aboard the Sea Connect; and has the capability to lift and lower multiple modules of the invention as shown in FIG. 1.

Now turning to FIG. 7, 54, illustrates the end cut away view of the Sea Connect platform, while lowering a nine by four container mover onto the deck of the high speed ocean going barge; 55, shows the Container Gantry Crane cables being guided through the horizontal reinforcing angle; 56, illustrates the port barge container mover blocks in the retracted position; 57, shows the end view of the high speed barge from the aft looking forward; 58, illustrates the starboard barge container mover blocks in the retracted position; 59, depicts the crane deck in its retracted position; 60, shows the four thousand ton Container Gantry Crane; and, 61, illustrates the crane deck in its normal, closed position.

Figure 8:
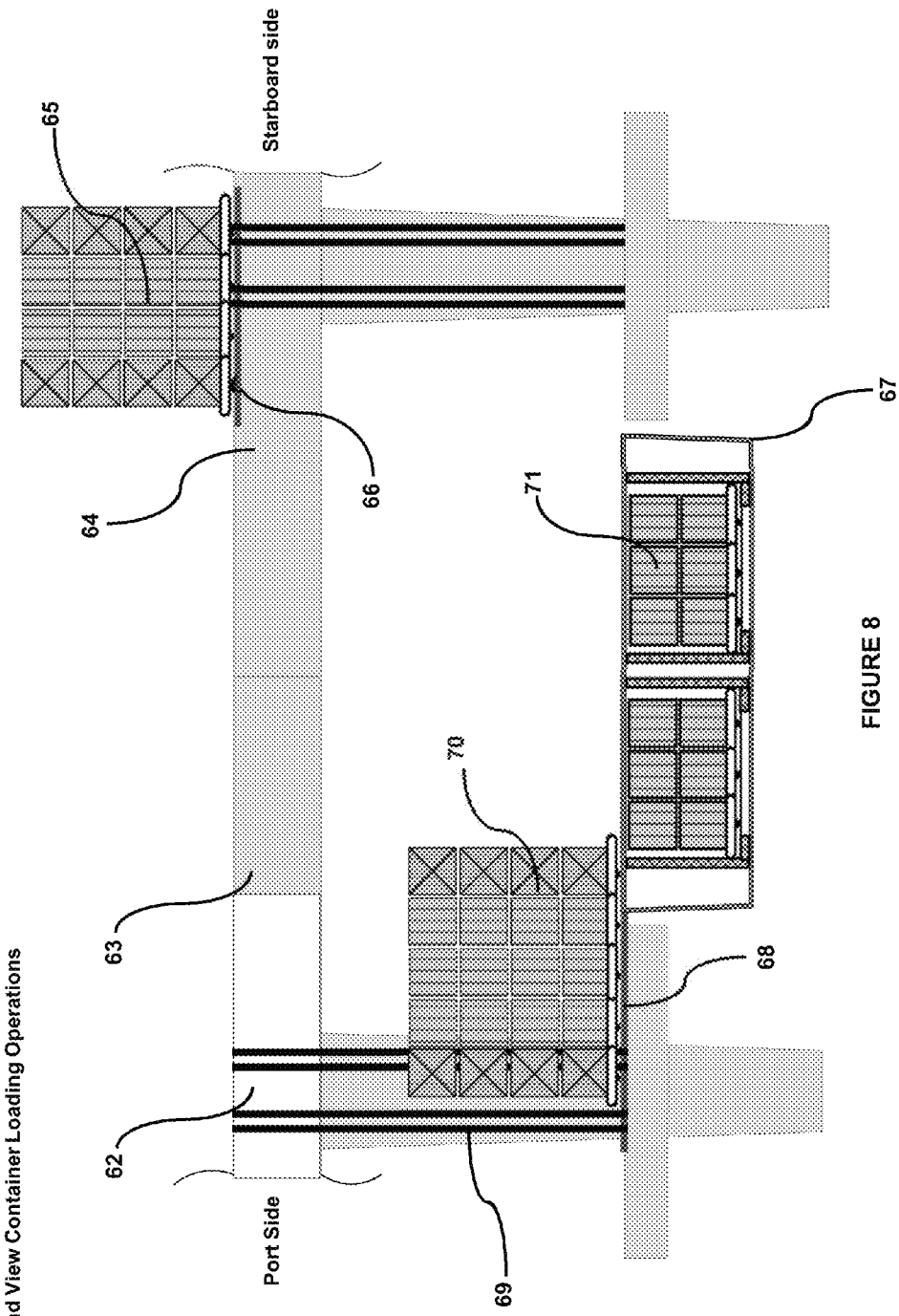
FIG. 8 illustrates the optional electro-hydraulic elevator components contemplated as a standard element by the overall system, which also possesses the Four Thousand ton capacity and has the capacity to lift and lower multiple modules of the invention as shown in FIG. 1.

Turning now to FIG. 8, 62, illustrates the elevator deck in the open position; 63, depicts the aft end view of one barge lane showing both side elevators operating with container movers being loaded onto the high speed barges in the Barge Alley; 64, illustrates the elevator deck in the closed position; 65, illustrates a four by four standard container stack; 66, shows the heavy duty, high capacity elevator in the weather deck position; 67, illustrates the aft end view of the high speed barge; 68, depicts the port side elevator in the barge deck position loading a five by four container mover onto the upper deck of the high speed barge in the Barge Alley; 69, illustrates the heavy duty, high capacity hydro-electric elevator vertical rails; 70, shows the 'x' braced outside container stack; and, 71, shows the three by two below deck container mover, stored on the internal barge elevators.

Turning now to FIG. 9A, 72 there is shown a side plan view of a Omni-directional ball wheel assembly; 73, illustrated the load slip plate which allows for the containers to slip into place ; 74, depicts the heavy duty industrial shocks springs; 75, shows the end view of the explosion proof electric motor; 76, illustrates the drive gear to ball wheel relationship; 77, shows the secondary drive wheel to ball wheel relationship; and 78, depicts the ball wheel keeper rings which allows for the change or replacement of the composite ball wheel when necessary. Looking now at FIG. 9B, 79, is the top plan view of the shock springs; 80, shows the top view of the radius of the primary ball wheel keeper; 81, shows the outer edge of the slip plate relative to the ball wheel assembly; 82, shows the placement of the ball wheel assembly relative to the container bean support component; 83, illustrates further additional drive gears; 84, depicts the top view of the explosion proof electric motors; and, 85, shows the positioning of the secondary drive wheels relative to the assembly.

What is claimed is:

1. A system capable of moving a standard or modified (length extended) shipping container of twenty foot (20'); forty foot (40'); forty-five foot (45") and other additional lengths widths and heights, as the contemplated invention is fully adjustable, comprised of;
 a. a container mover module including a steel main frame component consisting of three (3) main short primary members and two (2) main long members;
 b. a series of four (4) actuating electric ball wheels per module that are omnidirectional, the series providing movement of the container carrier in any direction; wherein movement is initiated by a remote control command unit and,
 c. at least two (2) rechargeable batteries to provide energy to move under controlled circumstances, the fully loaded system,
 d. A series of steel cross members and rod adjustable diagonal members; and,
 e. A opposing pin connection assembly points allowing for the use of the contemplated invention to be assembled to meet any size shipping container and for the ability for modules of the invention to articulate in a vertical plane to allow for a smooth transition up ramps or inclines, and over bumps and transitions of heights from one deck onto another; and,
 f. a pin assembly lifting lug which allows for the lifting or lowering of a single or multiple module unit by either crane or elevator; and,
 g. a module connecting capability where containers can be stacked by container loaders, container stackers or overhead gantry type container cranes up to five (5) high, reinforced as required and/or connected to additional modules;

h. a series of lift and slide shocks to assist in defined and stable movements of the container mover relative to the decks of the offshore platforms, barges and/or surfaces of ports;

i. a sliding reinforced locking rail assembly, which immobilizes the modules from being able to articulate in the vertical plane, while lifting or lowering operations are underway;

j. a series of electro-hydraulic pumps used to imitate locking of the pin connection by a locking rail assembly;

k. a supplemental and ancillary reinforcement set of steel angles to further insure the stability of the containers while in being lifted and lowered or while in transit, l. a sensor array displayed on the operators digital HD display, indicating the relative positioning of the container mover to the platform deck, the barge deck, and the port surfaces;

m. a wireless single operator control panel unit for each individual container mover having sensing and communications capabilities; and, n. a wireless single operator control panel unit for each container mover of monitoring respective configuration and size to be monitored and tracked by the command and control operations of each platform, barge and/or port.

2. The system and methods of claim 1, and wherein the system can work on all types of shipping environments including but not limited to, offshore sea ports, shipping barges and existing ports and surfaces.

3. The system and methods of claim 2, wherein said rechargeable power storage system will collect and store energy, and deliver electric energies by transferring into the container module drive motor and hydro-electric pistons.

4. The system and methods of claim 3, wherein the system will not compromise the actual operation of, or the safety of the offshore sea port, barges or port systems that the invention is being integrated into.

5. The system and methods of claim 4, wherein the system can be used regardless of shipping container type, standard weights and sizes and a system that can be reconfigured and resized to meet any and all requirements.

6. The system and methods of claim 5, wherein the invention and its rechargeable power generating system is highly adaptable to every type of geographic and weather environment.

7. The system and methods of claim 6, wherein the invention can be reconfigured to include specialty containers selected from a list including refrigerated containers and liquids carrying containers.

8. The system and methods of claim 7, wherein the number of modules deployed will correspond directly to the throughput requirements of the offshore sea port, the delivery barges and the existing primary and intermodal ports.

9. The system and methods of claim 8, wherein that near future development alternate drive wheel or track assembly types will be considered as inherent to the invention.

10. The system and methods of claim 9, wherein offers that the invention has many manifestations as to specific applications in terms of types of environments, and wherein all components are inter-changeable and compatible throughout the entire system.

11. The system and methods of claim 10, wherein offers that a corresponding development of specialty regional container ports and or receiving areas will result and that these operations that are directly a result of the invention.

\* \* \* \* \*